April 27, 1948.   W. B. WIEGAND ET AL   2,440,424
MANUFACTURE OF CARBON BLACK
Filed May 4, 1944
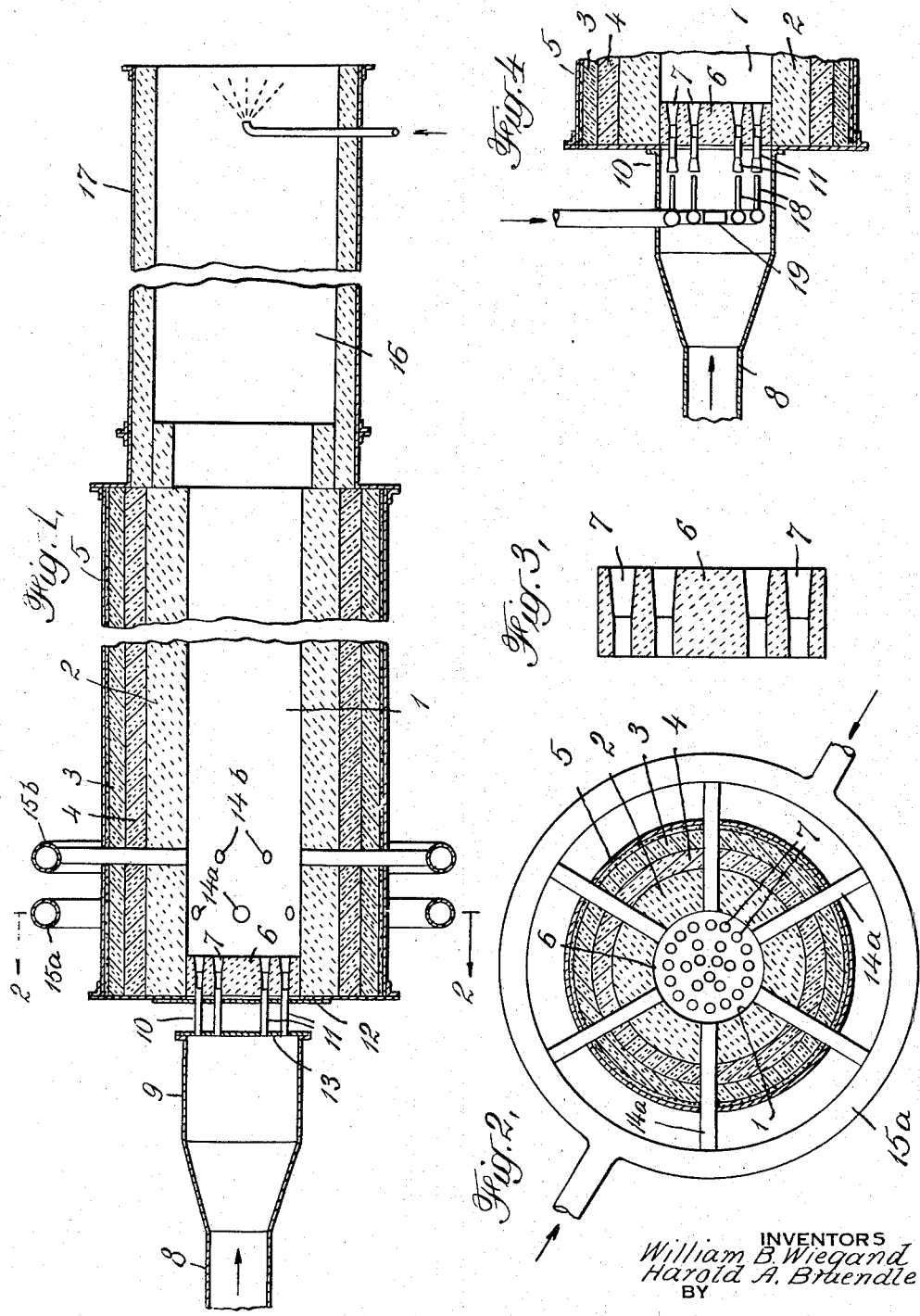
INVENTORS
*William B. Wiegand*
*Harold A. Bruendle*
BY
*Pennie, Davis, Marvin, & Edmonds*
ATTORNEYS Patented Apr. 27, 1948

2,440,424

UNITED STATES PATENT OFFICE 2,440,424

MANUFACTURE OF CARBON BLACK

William B. Wiegand, Old Greenwich, Conn., and Harold A. Braendle, Garden City, N. Y., assignors to Columbian Carbon Company, New York, N. Y., a corporation of Delaware Application May 4, 1944, Serial No. 534,090

5 Claims. (Cl. 23—209.8)

This invention relates to carbon black and more particularly to an improved process whereby carbon black embodying a novel combination of characteristics, including fineness of subdivision, a high degree of purity and desirable rubber compounding properties, may be produced.

Carbon blacks are widely used in various industries, for instance, as pigments in inks, paints, lacquers and the like, and as re-enforcing agents in various rubber compounds. They vary widely as to fineness of subdivision, purity and other properties and as to the combination of various characteristics desirable in carbon black to be used in the compounding of rubber for various purposes.

The desirability of certain particular characteristics and combinations of various characteristics in carbon black to be used in the compounding of rubber depends largely upon the type of rubber compound to be produced and the particular properties desired to be embodied in the rubber article to be fabricated therefrom. Heretofore, it has been extremely difficult, and in most cases impossible, to produce a carbon black which was not deficient as to one or more desired properties.

In our co-pending application Serial No. 448,806, filed June 27, 1942, there is described a carbon black possessing a novel combination of characteristics by reason of which it is particularly suitable for certain purposes, including the manufacture of rubber goods having special properties and also as a pigment. By use of the carbon black there described, in the compounding of rubber, it has been found possible to produce rubber compositions possessing novel and highly desirable combinations of characteristics.

Due to the difficulty in otherwise defining various properties of carbon black, it has become customary in the art to classify and grade carbon blacks, particularly carbon blacks used in the compounding of rubber, by reference to the properties of standard rubber compositions in the compounding of which the particular carbon black has been used. Thus, where one type of carbon black is used, for instance rubber grade impingement carbon black, the resultant rubber composition will be found to be fully reinforced, i. e., the cured rubber composition will have a high tensile strength, high modulus of rigidity and excellent wear-resistant properties. Accordingly, such carbon black is commonly designated "full reinforcing carbon." Where another type of carbon black is used, equivalent compounding conditions being employed, the resultant cured rubber composition may be found to have a lower tensile strength and lower resistance to wear. Such carbons are commonly designated "semi-reinforcing carbons," sometimes "soft carbons." Similarly, some carbons will impart to rubber compositions a relatively low modulus. Some carbons produce rubber compositions which heat excessively upon flexing, some produce high rebound, some high and others relatively low electrical resistivity. Characteristics of the particular carbon black are thus designated according to the characteristics of the standard rubber composition compounded therewith, i. e., high modulus, low modulus, high or low electrical resistivity or high or low rebound and the like. Many of these characteristics are usually expressed in terms of some standard commercial carbon black product, frequently "rubber grade impingement carbon black."

Our present process is especially applicable to the production of the carbon black described in our said copending application, which is characterized by optimum fineness of subdivision, a high degree of purity, optimum tinting strength, a non-acidic reaction, good workability or ease and economy of processing in the compounding of rubber, ink or the like, and an ability to impart a unique combination of properties to rubber compounds in which it is incorporated. As a rubber-compounding agent, this carbon black possesses a novel combination of characteristics including easy processing, non-interference with vulcanization and of imparting to rubber compositions in which it is used full reinforcement, superior flex resistance, low hysteresis, good electrical conductivity and good heat stability and aging properties. The individual characteristics of the carbon black may, by our process, be varied somewhat by varying operating conditions, as hereinafter more fully described and illustrated.

In the above-noted co-pending application and our Patent No. 2,378,055, issued June 12, 1945, there is described a process whereby said carbon black has been produced. The present invention constitutes improvements in the particular operation there described and is especially applicable to large-scale commercial production of carbon blacks of the said type.

In general, the process of our present invention, comprises rapidly and thoroughly admixing a hydrocarbon gas, natural gas for example, in regulated amounts with a high velocity, highly turbulent blast flame containing oxygen substantially in excess of that required for complete combustion of the blast gases.

The blast flame may be produced by combustion of a mixture of a fuel gas, natural gas for instance, and an oxygen-containing gas, air for instance, in which the proportion of air or oxygen is substantially in excess of that required for the complete combustion of the fuel gas, while blasting the combustible mixture into an elongated, unobstructed chamber, at an exceedingly high velocity. The character of the flames is of major importance and in order to produce a flame of the required characteristics we have found it desirable carefully to control the blast nozzle velocity of the blast gas and the proportion of oxygen therein.

In order to produce a carbon black having the properties previously described, the proportion of air in the blast gases should exceed that required for complete combustion usually by at least about 10% and advantageously may be 25% in excess of that required for complete combustion. However, the proportion of air should be much less than that required for the combustion of the total hydrocarbon gases, i. e., that contained in the blast gases plus the hydrocarbon gas injected into the blast flame, herein designated make gas. The combustible blast mixture may be premixed or may be admixed at the burner nozzle.

The highly turbulent active blast flame suitable for the purposes of our present process may be produced by burning the blast gas mixture under conditions of unusually high blast flame velocities, i. e., blast nozzle velocities in excess of about 35 feet per second and preferably about 80 to 85 feet per second. Blast nozzle velocities within the range of about 55 to 155 feet per second, which is in excess of velocities normally encountered in blast burner operation, have been used with particular advantage. The optimum blast nozzle velocity will vary somewhat with the nozzle size but must be sufficient to produce a violently turbulent blast flame.

Advantageously, the temperature of the blast flame at the point of introduction of the make gas does not exceed about 2600° F., though higher temperatures, say up to about 2900° F., may be employed. The temperature at the point of make gas entry is not necessarily the maximum temperature attained in the operation, as combustion continues beyond such point, depending upon the particular operating conditions. In commercial sized units the zone of maximum temperature will generally be found to be further down-stream.

We are unable at present to state with certainty the precise nature and composition of the blast flame at the zone of introduction of the make gas or to account for the peculiar effect of such conditions on the nature of the carbon black product. We can, however, state with certainty that at the zone of introduction of the make gas, the flame is violently turbulent and in an ionized condition. It is probable that the flame gases at this zone contain considerable amounts of partially oxidized hydrocarbons, such as aldehydes and similar materials. Because of the high temperature and unstable condition of the flame gases accurate analysis is extremely difficult, if not impossible, but a distinct odor resembling aldehyde has been observed. That combustion of the fuel gas is continuing at the zone of introduction of the make gas is evidenced by the observation that, generally, even when the make gas is not being introduced, the maximum temperature of the gases within the chamber is attained at a point further along in the chamber. Means of obtaining the desired results are herein disclosed and an accurate understanding of the theory involved is not essential to the attaining of such results.

In the operation, the blast flame is injected into an elongated, unobstructed reaction chamber, preferably insulated against substantial loss of heat by radiation. The charge to the chamber is so proportioned to the cross-sectional area of the chamber as to produce a high state of turbulence throughout the chamber. The make gas is injected into the blast flame at a zone where combustion has progressed to form an active flame but before complete combustion has occurred, as indicated by further temperature development.

The make gas may be introduced as a high velocity jet, one or more such jets being used. It should be introduced so as to avoid impingement thereof upon the confining walls of the chamber prior to attainment of substantial admixing thereof with the flame gases, as otherwise carbon will be rapidly deposited at the point of impingement and will interfere with optimum yield of carbon black of the desired characteristics.

The make gas is with advantage introduced through heat conducting refractory tubes extending through the hot walls of the chamber, so that the make gas is to some extent pre-heated before coming into contact with the blast gas, and at a velocity sufficient to inspire flame gas and such that the jet of make gas and inspired flame gases will project out into the blast flame avoiding contact with the confining walls of the reaction chamber.

The make gas should be rapidly and uniformly admixed with the flame gases. This is with advantage accomplished by injecting the make gases into the stream of flame gases at a substantial angle to the direction of flow of the flame gases, say not less than about 30°. Injection of make gases at substantially right angles to the stream of flame gases has been used with advantage, but this is not essential to the successful operation of our present process so long as rapid and uniform admixing with the flame gases is attained.

Prior to injection of the make gas into the blast flame, the former may with advantage be pre-heated to a temperature at which incipient cracking is attained but should not approach the temperature at which coke or carbon is formed. Such pre-heating may be effected by heat absorbed from the heat-conducting refractory tubes through which the make gas is passed into the furnace chamber. For instance, the make gas tubes may be fabricated from refractories such as silicon carbide and arranged so as to pass through the furnace walls through openings of sufficient clearance to permit adjustment of the position of the discharge end of the tubes with respect to the inner wall of the reaction chamber. Thus, the discharge end of the make gas tube or tubes may be positioned flush with the inner surface of the chamber wall or may extend beyond the wall into the blast flame to provide additional preheating or partial pyrolysis of the make gas.

The gaseous mixture is passed on through the unobstructed reaction chamber and is maintained at a high velocity and in a high state of turbulence and at a temperature sufficiently high to decompose the make gas for a period sufficient to effect the formation of carbon particles in suspension in the gaseous mixture. The reaction products are maintained at an elevated temperature for sufficient time substantially completely to crack the hydrocarbon present and are then cooled and the carbon separated therefrom. The operating conditions, such as temperature and time of reaction, are to a considerable extent interdependent. Other conditions may also be varied somewhat within limits as hereinafter more fully described.

The process will be further described with reference to the accompanying drawings which represent a type of apparatus particularly adapted to the carrying out of the process.

Figure 1 of the drawings is a longitudinal sectional view of the apparatus;

Figure 2 is a transverse sectional view of the apparatus along the line 2—2;

Figure 3 is an enlarged cross-sectional view of the burner block; and

Figure 4 is a sectional view of an alternative type of burner assembly.

The apparatus comprises an elongated cylindrical retort or reaction chamber 1, lined with fire brick 2. Surrounding the layer of fire brick are two outer layers of insulating material 3 and 4, respectively, all encased in a sheet metal cylindrical steel shell 5. At the forward end of the cylindrical retort there is a burner block 6 of heat resistant ceramic material, provided with a plurality of flared blast ports 7, shown in greater detail in Figure 3 of the drawing. The burner block is of such dimension as to slide into the forward end of the cylindrical chamber 1, and to be secured therein by conventional means.

A combustible mixture of fuel gas and air under pressure is passed through duct 8 to chamber 9 and from thence is blasted through the blast burner head 10 and through the blast ports 7 of burner block 6, into chamber 1.

The blast burner head 10 is composed of a plurality of tubes 11 supported by and projecting through plates 12 and 13 so that the ends of the tubes 11 nearest the burner block project slightly into the blast ports 7. The plate 12 is securely anchored to the end wall of the chamber 1 by conventional means. Plate 13 is securely fastened to the housing of the enlarged chamber 9 so as to make a gas-tight fit.

In operation a combustible air-gas mixture under high pressure is formed through the conduit 8 and chamber 9 and blasted through the blast ports 7 into the chamber 1 wherein the blast gases are ignited and burned to form a violently turbulent blast flame projecting, as an active flame, through chamber 1 to a point beyond the make-gas entry tubes 14a.

Make-gas entry tubes 14a and 14b are connected at their outer ends to suitable manifolds, such as bustle pipes 15a and 15b, and project through the walls 2, 3 and 4 into chamber 1. As previously noted, the inner end of make-gas tubes may be flush with the inner chamber wall or may project to a greater or less extent out into the blast flame. Advantageously, these make-gas tubes may be so arranged that the position of their inner ends may be adjusted with respect to the inner wall chamber 1. The make-gas tubes are with advantage positioned at a substantial angle to the longitudinal axis of the chamber 1. In the drawing these tubes are shown at right angles to the direction of the flow of hot gases through the furnace but the angle is subject to considerable variation.

In the particular apparatus illustrated two sets of six make-gas tubes each are provided as appears in greater detail in Figure 2 of the drawing. However, depending upon the size and capacity of the apparatus, a greater or lesser number of make-gas tubes may be used. Also, in the apparatus shown, the make-gas tubes are so arranged that for each tube there is a diametrically opposite tube. By this arrangement it has been found that more rapid and thorough mixing of the make gas with the blast flame is effected and there is less chance of a make-gas stream impinging upon the walls of the chamber prior to dilution adequate to prevent the building up of carbon deposits on the wall.

As previously noted, the apparatus shown is provided with two sets of make-gas tubes, 14a and 14b, one somewhat further downstream than the other, so as to permit adjustment of the make-gas entry with respect to the blast flame. Additional sets of make-gas entry tubes may be included in the apparatus so as to facilitate further adjustment. Usually only one set is used at any one time and the selection of the set used will generally depend upon the length of the blast flame under the particular operating conditions.

The resultant mixture of blast flame gases, make gas and decomposition products thereof, continues through chamber 1 and passes therefrom into a cylindrical chamber 16, shown in the drawing as somewhat larger in cross-sectional area than chamber 1. The walls 17 of chamber 16 are advantageously of firebrick or similar material adapted to withstand high temperatures, and are with advantage uninsulated or only slightly insulated so as to permit a substantial loss of heat to the atmosphere and thus effect a gradual cooling of the decomposition products passing therethrough. If desired chamber 16 may be water-jacketed or air-jacketed for effecting cooling artificially. However, by sufficiently extending chamber 16, adequate cooling is obtained by natural means. From chamber 16 the admixed gases and suspended carbon particles may be passed to a conventional water spray cooler and collection system.

The commercial operations, where a number of reaction chambers are in operation, it has been found advantageous to use an enlarged rectangular blending chamber into which a plurality of retorts discharge instead of using a separate chamber, such as shown at 16, for each retort.

The primary purpose of chamber 16 is to maintain the reaction mixture at an elevated temperature for a period of time sufficient to complete the reaction and formation of the desired product. However, during this stage of the operation, it is not necessary to maintain the reaction chamber temperature and a relatively slow reduction in temperature appears desirable. Further, in this stage of the operation, reduced turbulence is permissible.

If desired, the chamber 16 may be of the same cross-sectional area as chamber 1 and the desired time factor obtained by prolongation of the chamber. However, economy of construction usually dictates an enlarged cross-sectional area, such as illustrated in the drawings, in preference to elongation of the chamber.

Further, it is not essential that the chambers 1 and 16 be cylindrical. Rectangular chambers, for instance, may be used.

The cross-sectional area and length of chamber 1 should bear such relationship to operating capacity, i. e., volume of the gaseous mixture passing therethrough, that a high velocity and high degree of turbulence is maintained for a period of time sufficient to effect the formation of the carbon particles under highly turbulent conditions. Where a cylindrical chamber, such as shown in the drawings, is used, it has usually been found desirable that the diameter of the chamber not much exceed about 2 feet. Where cylindrical chambers of larger diameters are used, difficulties are apt to be experienced with the injection of the make gas and adequate mixing thereof with the blast flame. Similarly, where rectangular reaction chambers are used, at least one transverse dimension may with advantage be restricted to not more than about two feet.

Where reaction chambers of relatively small cross-sectional areas are used, a single blast jet may be employed instead of a multiple jet burner block such as shown in the drawing. However, in larger units, having cross-sectional diameters approximating 9 inches or over, a plurality of jets should be employed in order to supply a sufficient volume of blast flame of the desired velocity and turbulence and to effect a uniform flame development across the transverse section of the chamber.

The throat of the blast nozzle or nozzles should not exceed about 2" to 2½" in diameter. Diameters greater than 2½" have generally been found undesirable. Burner blocks so designed as to create a zone of eddy currents at the periphery of each blast nozzle exit appear to assist in maintaining ignition of the blast gases at the nozzle exit, to permit maximum jet velocities and to assist in maintaining maximum rate of combustion and uniform flame development across the transverse section of the furnace. A substantial area of relatively flat surface at the burner block face appears to assist in establishing and maintaining such a zone of eddy currents.

The total area of the burner ports should be such as to produce adequate velocity of the entering combustible mixture to provide a highly turbulent blast flame and such velocity that the flame cannot strike back into the supply line, where premixed air and gas are used. Satisfactory operation has been obtained, as previously noted, with blast gas nozzle velocities in the range of from about 35 to 135 feet per second, based on volumes measured at 60° F., and an absolute pressure of 30" of mercury. Nozzle velocities of about 85 feet per second have been found particularly effective.

Instead of supplying premixed air and gas to the system, the air and gas may be separately supplied, for instance as illustrated by Fig. 4 which represents an assembly of a burner block 6, such as shown in Fig. 3, and burner head 10, to which the air is supplied through duct 8, unmixed with fuel gas. With this arrangement, the fuel gas is jetted into the air streams passing through tubes 11 by fuel jets 18 to which the fuel gas is supplied under pressure through a suitable manifold 19.

Optimum dimensions of the retort will vary according to capacity and, with a given apparatus, a limited variation in operating conditions is permissible. It is essential that a highly turbulent, oxidizing blast flame be maintained and that the make gas be injected into the active flame. It is also essential that the velocity of the gas mixture through the retort chamber be sufficiently great to create a high state of turbulence.

We have obtained satisfactory turbulence in commercial sized units at velocities of about 35 to 100 feet per second measured under operating conditions, say at an average temperature of about 2400° F., or a velocity of about 400 to 1100 feet per minute, calculated for standard conditions, 60° F., and 30 inches of mercury. Particularly desirable results have been obtained at velocities about 60 to 90 feet per second, based on an average temperature of 2400° F., or about 650–1000 feet per minute at standard conditions. The lower velocities have been found satisfactory only in chambers of relatively small cross-section, say not over 14 inches in diameter.

The period of time over which turbulence is maintained is also subject to variation. Under usual operating conditions, the high velocity section of the chamber should be at least five feet in length, following the introduction of the make gas, and preferably not less than about 7 feet. High velocity sections up to 15 to 20 feet have been used with advantage. The length of the high velocity section of the furnace, to a considerable extent, is dependent upon the velocity of the gases through the furnace so as to afford the necessary time factor at the elevated temperature.

The characteristic of the product is influenced by the duration of the period of contact with the high temperature gases in chambers 1 and 16. The termination of this period is with advantage effected by sudden cooling of the mixture, as by means of a water spray, to about 1800° F. Thereafter, the temperature may be dropped to about 500° F., and the carbon black collected by any conventional means.

The optimum contact time will vary to a noticeable extent with the richness of the fuel and make gas and the proportion of air to total gas used. Other things being equal, a reduced contact time is usually desirable where a richer hydrocarbon gas is used. The contact time herein referred to is the period of time between injection of the make gas into the blast flame and the cooling of the resultant gases and suspended carbon to about 2000° F., as by radiation or by subjection thereof to a spray cooling stage.

Contact times varying from about 0.25 to 2.6 seconds have been found satisfactory with proper adjustment in operating conditions. However, contact time may be maintained within the range of 0.5 to 1.5 seconds with advantage in commercial operations. A contact time of about 1.1 seconds has been found most desirable for the production of a carbon black of high modulus, high tensile strength and low electrical resistivity. In general, if the contact time is too greatly prolonged, a reduction in the reinforcing properties of the resultant carbon black has been observed. Where too short a contact time is permitted, lower yields are obtained and the product will tend to have low modulus and a higher extractable content. Too short a contact time requires the use of excessively high temperatures to produce carbon black of comparable properties.

The temperature of the blast flame at the point of introduction of the make gas should be sufficiently high to effect rapid decomposition of the make gas and the quantity of heat in the blast gases should be such that, upon admixture of the make gas therewith, the resultant temperature of the mixture will be sufficiently high to initiate and substantially complete the decomposition of the make gas. Generally, the temperature of the blast flame at the point of introduction of the make gas should be within the range of about 2100–2700° F. Particularly satisfactory results have been obtained in operations in which the blast flame temperature was between 2450 to 2700° F., as measured by an optical pyrometer, focused on on a Carbofrax target tube positioned just upstream from the zone of introduction of the make gas. In normal commercial operation, blast flame temperatures ranging from 2460 to 2600° F., and particularly within the range of 2480 to 2550° F., have been used with particular advantage.

Temperatures higher or lower than the specified range have been found to result in decreased yields. At higher temperatures there is a tendency to produce a low modulus carbon black.

The temperature of the blast flame will depend primarily upon the ratio of fuel gas and air, the rate of combustion and upon the B. t. u. value of the fuel gas.

Using a natural gas with a B. t. u. value of 1016, optimum results have been obtained using a ratio of blast air to fuel gas within the range of about 12.5:1 to 15:1. As this ratio is decreased, the modulus of the carbon black product has been found to decrease and, further, electrical conductivity characteristics of the resultant carbon are detrimentally affected. In small apparatus we have found it possible to operate with little or no excess air. However, in commercial sized operations it is essential that the amount of oxygen present in the blast gases be substantially in excess of that required for complete combustion of the fuel gas. The excess oxygen appears to have an activating effect upon the carbon and, further, to react to a greater or less extent with hydrogen or make gas to liberate heat and thus prevent excessive temperature drops downstream due to endothermic cracking reactions.

The optimum point of entry of the make gas will vary with the particular apparatus and the amount and nozzle velocity of the blast gas stream. It has usually been found that the blast flame has developed properties optimum for the induction of the make gas at a distance downstream from the zone of initial ignition equal to about one to two times the diameter or minimum transverse dimension of the reaction chamber. The point of injection of the make gas should normally be downstream from the zone of maximum rate of combustion of the blast flame but upstream from the point of complete combustion. The exact point where optimum conditions are obtained will vary somewhat with the particular apparatus but, under normal operation, it should not exceed a distance greater than about three diameters of the reaction chamber from the point of initial ignition. Where the make gas is injected into the blast flame at a point in advance of the zone indicated, there is a tendency for the yield to drop off rather sharply. Further, the injection of the make gas into the blast flame at a point beyond this zone tends to cause a substantial reduction in the modulus and electrical conductivity of the product.

A high nozzle velocity of the blast gas mixture is desirable in order to generate the necessary highly turbulent blast flame and in order to develop a high rate of combustion and rapid heat release. As previously noted, blast nozzles in excess of about 2½ inches in diameter have generally been found undesirable. It is necessary, however, that a sufficient volume of the blast mixture be injected into the reaction chamber to produce the required temperature and turbulence. In reaction chambers of smaller cross-section, a single blast nozzle may be employed. However, in commercial sized operation, the increased volume of blast gases should be provided by the use of a plurality of blast nozzles rather than the use of a single blast nozzle of greater diameter. The use of smaller sized nozzles has the advantage of providing a greater area of contact of the blast gases with the hot refractory tube and a better mixing of the blast gases with hot products of combustion by inspiration. Further, the use of small nozzles tends to give a flame of more uniform composition and temperature across the transverse section of the reaction chamber.

The velocity at which the make gas is injected into the blast flame depends largely upon the cross-section of the reaction chamber. Where a cylindrical chamber is used, the optimum velocity of the make gas appears to increase generally as the square of the diameter of the chamber. In normal operations, make gas velocities of from about 40 to about 200 feet per second may be used with advantage. Velocities of about 100 to 150 feet per second have been used with particular advantage in reaction chambers of about 2 feet in diameter.

Make gas entry tubes of about $\frac{1}{8}$" to 4" in diameter have been used with advantage. Usually tubes of about 1" in diameter are most advantageous. As previously noted, such tubes may terminate flush with the inner wall of the reaction chamber or may project out into the stream of blast gases so as to effect a preheating of the make gas prior to admixture with the blast flame.

The velocity at which the make gas is injected into the reaction chamber is important as it influences to a considerable extent the rate at which the make gas becomes admixed with the blast flame through inspiration and turbulence. Velocities within the specified range have also been found effective in carrying the stream of make gas away from the wall of the reaction chamber and thus avoiding coke formation. Generally, as the transverse dimension of the reaction chamber increases, higher velocities are desirable in order to effect a mixing of the make gas uniformly across the flame. Uniform mixing is more readily obtained where make gas entry tubes of smaller diameter are used. Increasing the size of the make gas entry tube has a tendency to result in a carbon product of somewhat increased average particle size.

The character of the product has also been found to vary somewhat with the ratio of blast air to total hydrocarbon gas, i. e., fuel gas plus make gas. Satisfactory results have been obtained by maintaining this ratio within a range of about 4 to 5.7. In general, optimum results have been obtained in the production of a fully reinforcing carbon of full modulus using natural gas where the amount of air supply is within the range of about 44 to 58% of that which would be required for the complete combustion of the fuel gas and the make gas.

In general, other operations remaining constant, an increase in make gas has a tendency to increase the yield, to increase the particle size and the extractable content of the black and to decrease the tensile strength and electrical conductivity properties of the product. Where the ratio of air to total gas is either above or below the optimum range, a decrease in the modulus characteristics of the product has been observed. Our improved process has the advantage that a relatively inexpensive hydrocarbon gas, such as natural gas, consisting principally of methane, can be used as the principal source of heat and the composition of the make gas can be varied independently of the composition of the fuel gas. Because of the economic factor, natural gas, consisting principally of methane, is advantageously used as the make gas. However, it is sometimes advantageous to enrich the make gas with a hydrocarbon of higher carbon content such as propane or natural gasoline, acetylene, petroleum or creosote oils in order to increase the yield. Such enrichment is particularly advantageous where carbon blacks of high modulus are desired.

In general, the effect of increasing the B. t. u. content of the make gas, by the addition of such other hydrocarbons, is to increase the modulus, particle size and yield of the carbon black product. In the production of high modulus carbons, it has been found that a B. t. u. content of at least 1150 B. t. u. per cubic foot, and preferably 1500 to 1600 B. t. u. per cubic foot, is desirable for optimum reinforcing properties and yield. Further enrichment beyond this range has been found to tend toward the production of a carbon black of reduced tensile strength and inferior reinforcing properties.

Hydrocarbons which decompose without absorption of heat, particularly aromatic and olefinic materials, have been found to have special value when added to the make gas in our present operation in imparting high modulus characteristics to the product and increasing the yield. Also, it is sometimes found advantageous to add hydrocarbons which decompose with evolution of heat to natural gas used as the make gas in our process in such proportions that the temperature drop which would normally be occasioned by endothermic cracking reactions as the gas stream proceeds through the reaction chamber is in part at least counteracted by the exothermic cracking of such added hydrocarbons.

Our invention will be further illustrated by the following specific examples of operations carried on in apparatus of different sizes and proportions. In each instance, the carbon black product resulting from the operation was compounded with natural rubber in accordance with the following standard tire tread formula:

| | Parts |
|---|---|
| Smoked sheet rubber | 100 |
| Carbon black | 52 |
| Zinc oxide | 3 |
| Stearic acid | 4 |
| Pine tar | 2 |
| Sulfur | 2.7 |
| Ketone amine reaction product | 1.5 |
| Mercaptobenzothiazole | 0.9 | and the resulting rubber composition cured and tested by conventional procedure. The operating conditions and characteristics of the respective carbon black products are set forth in the following tabulation:

The reaction chamber of the apparatus used in Example VI was rectangular, the dimensions being 17″ x 38″.

The effect of enrichment of the make gas with butane, for instance, is illustrated by the following additional Examples VII and VIII, operating conditions and character of the products of which are set forth in the following tabulation. In Example VII, the make gas was unenriched natural gas. In Example VIII, the same natural gas enriched with butane was used as the make gas.

| Example | VII | VIII |
|---|---|---|
| Diameter of Reaction Chamber, inches | 9 | 9 |
| Distance to Make Gas Entry, inches | 12 | 12 |
| Diameter of Make Gas Tube, inches | 3¼ | 1 |
| B. t. u./cu. ft. of Make Gas | 993 | 1,160 |
| Operating Conditions: | | |
| Air-cu. ft./hr | 8,040 | 8,000 |
| Ratio, Air/Fuel Gas | 12.4 | 14.5 |
| Ratio, Air/Total Gas | 4.59 | 4.7 |
| Approx. Contact Time, seconds | .69 | .70 |
| Approx. Blast Temp., °F | 2,420 | 2,280 |
| *Product* | | |
| Extractable, per cent | .23 | .09 |
| Properties in Natural Rubber: | | |
| Curing Time, Minutes | 15 | 15 |
| Modulus at 300% Elongation, lbs./sq. in | 1,205 | 1,640 |
| Tensile Strength, lbs./sq. in | 4,400 | 4,000 |
| Elongation, per cent | 675 | 595 |
| Shore Hardness | 65 | 66 |
| Log R, Electrical Resistivity | 2.3 | 2.8 |

In Example VIII a somewhat higher proportion of air in the combustible blast gas mix was used but other operating conditions, though not identical, were very similar. The yield from the operation of Example VIII was 3.9 pounds per thousand cubic feet of total gas used. That of Example VII was slightly lower. It will be observed, however, that the modulus characteristic of the product of Example VIII is substantially higher than that of Example VII.

In the operations of Examples II and III the make gas tubes extended into the reaction chamber for distances of 2 inches and 1 inch, respectively, beyond the chamber wall. In each of the other operations the inner end of the make gas tubes was flush with the walls of the reaction chamber. Also, in each instance, the make gas tubes were positioned at substantially right angles to the longitudinal axis of the chamber.

The modulus, tensile strength, elongation and Shore hardness values appearing in the foregoing tabulation were determined by conventional methods. The values for log R electrical resistiv-

| Example | I | II | III | IV | V | VI |
|---|---|---|---|---|---|---|
| Diameter of Reaction Chamber, Inches | 24 | 14 | 14 | 24 | 24 | |
| Distance to Make Gas Entry, Inches | 25 | 27 | 24 | 34.5 | 34.5 | 33 |
| Diameter of Make Gas Tube, Inches | 1 | 1 | 1 | 1 | 1 | 1 |
| B. t. u./cu. ft. of Make Gas | 1,016 | 1,016 | 993 | 1,090 | 1,090 | 1,200 |
| Operating Conditions: | | | | | | |
| Air, cu. ft./hr | 100,000 | 37,000 | 33,000 | 120,000 | 110,000 | 170,000 |
| Ratio, Air/fuel gas | 15 | 14.5 | 12 | 15 | 16.5 | 14.9 |
| Ratio, Air/total gas | 5.20 | 5.4 | 4.82 | 5.4 | 5.5 | 4.9 |
| Approx. Contact Time, seconds | 1.1 | 1 | .3–.5 | 1.1 | 1.1 | .9 |
| Approx. Blast Temp., °F | 2,600 | 2,520 | 2,540 | 2,500 | 2,430 | 2,600 |
| Yield, lbs./thousand cu. ft. of total gas | 3.1 | 1.7 | 2.4 | 3.4 | 2.9 | 5.7 |
| *Product* | | | | | | |
| Extractable, per cent | .18 | .02 | .25 | .10 | .05 | .14 |
| Properties in Natural Rubber: | | | | | | |
| Curing Time, Min | 17.5 | 15 | 15 | 15 | 15 | 15 |
| Modulus at 300% Elongation, lbs./sq. in | 1,335 | 1,245 | 1,365 | 1,165 | 1,205 | 1,230 |
| Tensile Strength, lbs./sq. in | 4,100 | 4,200 | 4,300 | 4,200 | 4,050 | 4,100 |
| Elongation, per cent | 615 | 630 | 627 | 650 | 640 | 655 |
| Shore Hardness | 64 | 63 | 65 | 64 | 62 | 63 |
| Log R, Electrical Resistivity | 2.1 | 2.3 | 3.1 | 3.1 | 2.5 | 3.6 | ity is the logarithm of resistivity in ohm centimeters and is derived from the equation $$\log R = \log \frac{rwt}{1}$$

where $r$ is the measured resistivity in ohms, $w$ the width of the test sheet in centimeters, $t$ the average thickness of the sheet in centimeters and 1 the distance in centimeters between the points of electrical contact with the test strip.

The contact time appearing in the foregoing tabulations for Examples I, II, IV, V, VII and VIII is the approximate time in seconds between injection of the make gas into the blast flame and the quenching of the hot mixture by means of a water spray to below active reaction temperatures or by reduction of the temperature to about 2000° F. by radiation cooling. The apparatus used in Experiment III employed a water-jacket to cool the hot mixture passing from the reaction chamber. The calculated contact time in the reaction chamber was 0.33 second and the calculated time to a point about half-way through the cooler, where the estimated temperature was about 2000° F., was approximately 0.5 second.

We claim:

1. In the process for producing carbon black which comprises the injecting into and burning within an elongated, uncooled and unobstructed reaction chamber of substantially uniform and relatively small cross-sectional area, a mixture of a combustible fuel gas and an oxygen-containing gas at such a rate as to produce a violently turbulent flow of gas and blast flame having a temperature sufficiently high to thermally decompose hydrocarbons, forcefully injecting into said blast flame gases while passing through said reaction chamber, and at a point removed from the point of introduction of said gas mixture, hydrocarbon make gas to be decomposed in such quantity that a hot mixture of the flame gases and the make gas is produced at a temperature at which the make gas is largely decomposed to form finely divided carbon, effecting thereby substantially instantaneous and complete mixing of the make gas with the flame gases, continuing the flow of the gas mixture through the elongated reaction chamber at high temperature and high turbulence whereby the make gas is decomposed by the heat of the flame gases within the reaction chamber and during the period of maintained turbulence, passing the mixture of gases and carbon from the reaction chamber and collecting the carbon, the steps of so proportioning the fuel gas, the oxygen-containing gas and the said hydrocarbon make gas that the oxygen present in the combustible mixture is substantially in excess of that required for complete combustion of the fuel gas and that said hydrocarbon make gas is injected in an amount substantially in excess of that required to consume the excess oxygen present in the blast flame gases, and injecting the said hydrocarbon make gas into a zone of active combustion of the blast flame.

2. In the process for producing carbon black which comprises the injecting into and burning within an elongated, uncooled and unobstructed reaction chamber of substantially uniform and relatively small cross-sectional area, a mixture of a combustible fuel gas and an oxygen-containing gas at such a rate as to produce a violently turbulent flow of gas and blast flame having a temperature sufficiently high to thermally decompose hydrocarbons, forcefully injecting said blast flame gases while passing through said reaction chamber, and at a point removed from the point of introduction of said gas mixture, hydrocarbon make gas to be decomposed in such quantity that a hot mixture of the flame gases and the make gas is produced at a temperature at which the make gas is largely decomposed to form finely divided carbon, effecting thereby substantially instantaneous and complete mixing of the make gas with the flame gases, continuing the flow of the gas mixture through the elongated reaction chamber at high temperature and high turbulence whereby the make gas is decomposed by the heat of the flame gases within the reaction chamber and during the period of maintained turbulence, passing the mixture of gases and carbon from the reaction chamber and collecting the carbon, the step of so proportioning the fuel gas, the oxygen-containing gas and the said hydrocarbon make gas that the oxygen present in the combustible mixture is substantially in excess of that required for complete combustion of the fuel gas and that the said hydrocarbon make gas is injected in an amount substantially in excess of that required to consume the excess oxygen present in the blast flame gases, and injecting the said hydrocarbon make gas into a zone of the reaction chamber downstream from the point of injection of the fuel gas mixture.

3. In the process for producing carbon black which comprises the injecting into and burning within an elongated, uncooled and unobstructed reaction chamber of substantially uniform and relatively small cross-sectional area, a mixture of a combustible fuel gas and an oxygen-containing gas at such a rate as to produce a violently turbulent flow of gas and blast flame having a temperature sufficiently high to thermally decompose hydrocarbons, forcefully injecting into said blast flame gases while passing through said reaction chamber, and at a point removed from the point of introduction of said gas mixture, hydrocarbon make gas to be decomposed in such quantity that a hot mixture of the flame gases and the make gas is produced at a temperature at which the make gas is largely decomposed to form finely divided carbon, effecting thereby substantially instantaneous and complete mixing of the make gas with the flame gases, continuing the flow of the gas mixture through the elongated reaction chamber at high temperature and high turbulence whereby the make gas is decomposed by the heat of the flame gases within the reaction chamber and during the period of maintained turbulence, passing the mixture of gases and carbon from the reaction chamber and collecting the carbon, the steps of injecting the mixture of fuel gas and oxygen-containing gas into the reaction chamber at a burner port velocity of at least 55 feet per second, so proportioning the fuel gas, the oxygen-containing gas and the said hydrocarbon make gas that the oxygen present in the combustible mixture is substantially in excess of that required for complete combustion of the fuel gas and that the said hydrocarbon make gas is injected in an amount substantially in excess of that required to consume the excess oxygen present in the blast flame gases, and injecting the said hydrocarbon make gas into a zone of the reaction chamber downstream from the point of injection of the fuel gas mixture.

4. In the process for producing carbon black which comprises the injecting into and burning within an elongated, uncooled and unobstructed reaction chamber of substantially uniform and relatively small cross-sectional area, a mixture of a combustible fuel gas and an oxygen-containing gas at such a rate as to produce a violently turbulent flow of gas and blast flame having a temperature sufficiently high to thermally decompose hydrocarbons, forcefully injecting into said blast flame gases while passing through said reaction chamber, and at a point removed from the point of introduction of said gas mixture, hydrocarbon make gas to be decomposed in such quantity that a hot mixture of the flame gases and the make gas is produced at a temperature at which the make gas is largely decomposed to form finely divided carbon, effecting thereby substantially instantaneous and complete mixing of the make gas with the flame gases, continuing the flow of the gas mixture through the elongated reaction chamber at high temperature and high turbulence whereby the make gas is decomposed by the heat of the flame gases within the reaction chamber and during the period of maintained turbulence, passing the mixture of gases and carbon from the reaction chamber and collecting the carbon, the step of so proportioning the fuel gas, the oxygen-containing gas and the said hydrocarbon make gas that the oxygen present in the combustible mixture is substantially in excess of that required for complete combustion of the fuel gas and that the said hydrocarbon make gas is injected in an amount substantially in excess of that required to consume the excess oxygen present in the blast flame gases, and injecting the said hydrocarbon make gas into a zone of the reaction chamber downstream from the point of injection of the fuel gas mixture and at a substantial angle to the direction of flow of the blast flame gases.

5. In the process for producing carbon black which comprises the injecting into and burning within an elongated, uncooled and unobstructed reaction chamber of substantially uniform and relatively small cross-sectional area, a mixture of a combustible fuel gas and an oxygen-containing gas at such a rate as to produce a violently turbulent flow of gas and blast flame having a temperature sufficiently high to thermally decompose hydrocarbons, forcefully injecting into said blast flame gases while passing through said reaction chamber, and at a point removed from the point of introduction of said gas mixture, hydrocarbon make gas to be decomposed in such quantity that a hot mixture of the flame gases and the make gas is produced at a temperature at which the make gas is largely decomposed to form finely divided carbon, effecting thereby substantially instantaneous and complete mixing of the make gas with the flame gases, continuing the flow of the gas mixture through the elongated reaction chamber at high temperature and high turbulence whereby the make gas is decomposed by the heat of the flame gases within the reaction chamber and during the period of maintained turbulence, passing the mixture of gases and carbon from the reaction chamber and collecting the carbon, the step of so proportioning the fuel gas, the oxygen-containing gas and the said hydrocarbon make gas that the oxygen present in the combustible mixture is substantially in excess of that required for complete combustion of the fuel gas and that the said hydrocarbon make gas is injected in an amount substantially in excess of that required to consume the excess oxygen present in the blast flame gases and injecting the said hydrocarbon make gas into a zone of the reaction chamber downstream from the point of injection of the fuel gas mixture and in a direction substantially perpendicular to the direction of flow of the blast flame gases.

WILLIAM B. WIEGAND.
HAROLD A. BRAENDLE.

REFERENCES CITED

The following references are of record in the file of this patent:

UNITED STATES PATENTS

| Number | Name | Date |
|---|---|---|
| 1,364,273 | Gerard et al. | Jan. 4, 1921 |
| 1,804,249 | Day | May 5, 1931 |
| 1,925,130 | Brownlee | Sept. 5, 1933 |
| 2,153,951 | Barber | Apr. 11, 1939 |
| 2,163,630 | Reed | June 27, 1939 |
| 2,292,355 | Ayers | Aug. 11, 1942 |
| 2,368,828 | Hanson et al. | Feb. 6, 1945 |
| 2,375,795 | Krejci | May 15, 1945 |
| 2,375,797 | Krejci | May 15, 1945 |
| 2,378,055 | Wiegand et al. | June 12, 1945 |

FOREIGN PATENTS

| Number | Country | Date |
|---|---|---|
| 24,256 | Great Britain | 1910 |

Certificate of Correction

Patent No. 2,440,424.                                    April 27, 1948.

WILLIAM B. WIEGAND ET AL.

It is hereby certified that errors appear in the printed specification of the above numbered patent requiring correction as follows: Column 2, line 37, before the word "our" insert *in*; column 5, line 43, for "formed" read *forced*; column 6, line 38, for "The" read *In*; column 8, line 74, cancel the word "on" second occurrence; column 13, line 74, claim 2, after "injecting" insert *into*; and that the said Letters Patent should be read with these corrections therein that the same may conform to the record of the case in the Patent Office.

Signed and sealed this 20th day of July, A. D. 1948.

[SEAL]

THOMAS F. MURPHY,
*Assistant Commissioner of Patents.*